United States Patent [19]
Haertl et al.

[11] Patent Number: 5,188,540
[45] Date of Patent: Feb. 23, 1993

[54] HEARING AID HAVING ELECTRICAL CONTACT MEANS ARRANGED IN A BATTERY COMPARTMENT

[75] Inventors: Christof Haertl, Neunkirchen; Jochen Mueller, Munich, both of Fed. Rep. of Germany

[73] Assignee: Siemens Aktiengesellschaft, Munich, Fed. Rep. of Germany

[21] Appl. No.: 852,950

[22] Filed: Mar. 17, 1992

[30] Foreign Application Priority Data

Mar. 21, 1991 [DE] Fed. Rep. of Germany ....... 4109306

[51] Int. Cl.$^5$ .............................................. H01R 13/00
[52] U.S. Cl. ................................... 439/500; 381/62.2
[58] Field of Search ........ 439/500; 381/68, 68.1-68.7, 381/69, 69.1, 69.2

[56] References Cited

U.S. PATENT DOCUMENTS 3,629,793 12/1971 Ettischer et al. .................... 439/500
4,548,082 10/1985 Maynard ............................... 73/585

FOREIGN PATENT DOCUMENTS 8808169.9 10/1988 Fed. Rep. of Germany .
8800629.8 6/1989 Fed. Rep. of Germany .

*Primary Examiner*—Joseph H. McGlynn
*Attorney, Agent, or Firm*—Hill, Steadman & Simpson

[57] ABSTRACT

A hearing aid having at least one additional contact is provided for the electrical connection of an external programing device to at least one programmable hearing aid part. In order to minimize requirements for the additional contact, individual contacts which are electrically insulated from one another are arranged within a battery compartment in the region of a surface lying opposite a battery pole. At least one of the individual contacts can then be electrically connected to a programmable hearing aid part.

8 Claims, 4 Drawing Sheets

HEARING AID HAVING ELECTRICAL CONTACT MEANS ARRANGED IN A BATTERY COMPARTMENT

BACKGROUND OF THE INVENTION

The present invention generally relates to a hearing aid having a plurality of electrical contact means arranged within a battery compartment for two-pole electrical connection of a battery to hearing aid component parts. At least one of the plurality of contact means can be used for the electrical connection of an external programing device to at least one programmable hearing aid part.

German Utility Model G88 00 629 discloses a hearing aid with three contacts, for example, wiper contacts, which are arranged in the battery compartment in addition to the two battery contacts. These contacts, known as socket or jack contacts, are arranged in a separate housing section neighboring the battery compartment. The three contacts are contacted by a plug which may be introduced into the battery compartment and is electrically connected to an external programming device. Since these additional contacts in addition to the socket part which holds the contact must be arranged in the battery compartment or in the environment thereof, the battery compartment must be larger than traditional battery compartments.

German Utility Model G88 08 169 discloses a hearing aid having a battery compartment at the lower end of the hearing aid onto which an audio shoe can be attached. Three contact springs which may be connected to an audio line and insulated from one another are arranged at an inside portion of the audio shoe adjoining the battery compartment. At their free ends, the contact springs comprise contact nubs that touch terminal contacts at the lower end of the hearing aid. As a result thereof, the hearing aid is directly connected to a hearing/speaking system or to a radio or to a television apparatus.

U.S. Pat. No. 4,548,082 discloses a battery compartment which may be connected to a hearing aid. Four contacts are arranged at the interface between the battery compartment and the hearing aid. When the battery compartment is removed, these four contacts are then contacted to a plug that is connected to an external programming device. Two of the contacts serve the purpose of data exchange in a simultaneous duplex mode. The other two contacts are power supply contacts through which the hearing aid is supplied with power, both from the programing device and from the battery. The battery compartment must also internally comprise two contact means for contacting the two battery poles. Consequently, four additional contacts at the interface and the corresponding space therefor are required in this embodiment in addition to the contacts connected to the battery poles in the battery compartment.

SUMMARY OF THE INVENTION

It is, therefore, an object of the present invention to create a hearing aid in which the space required for the additional contact means is minimal.

The invention provides an apparatus in which the space present within the battery compartment for power supply contacts is multiply utilized. At least one of the required or existing contact means for the power supply from the hearing aid battery can be divided into individual contacts insulated from one another. As a result the division of an originally large contact into individual, smaller contact means, the space required in the battery compartment remains substantially constant. Consequently, additional contacts are available in the battery compartment without requiring additional space in the hearing aid for this purpose. When all of the individual contacts are fastened within the battery compartment after the battery has been introduced into the compartment, the battery lies opposite the contacting surface of a planar battery pole.

Additional features and advantages of the present invention are described and will be apparent from the detailed description of the presently preferred embodiments and from the drawings.

DETAILED DESCRIPTION OF THE PRESENTLY PREFERRED EMBODIMENTS

Figure 1:
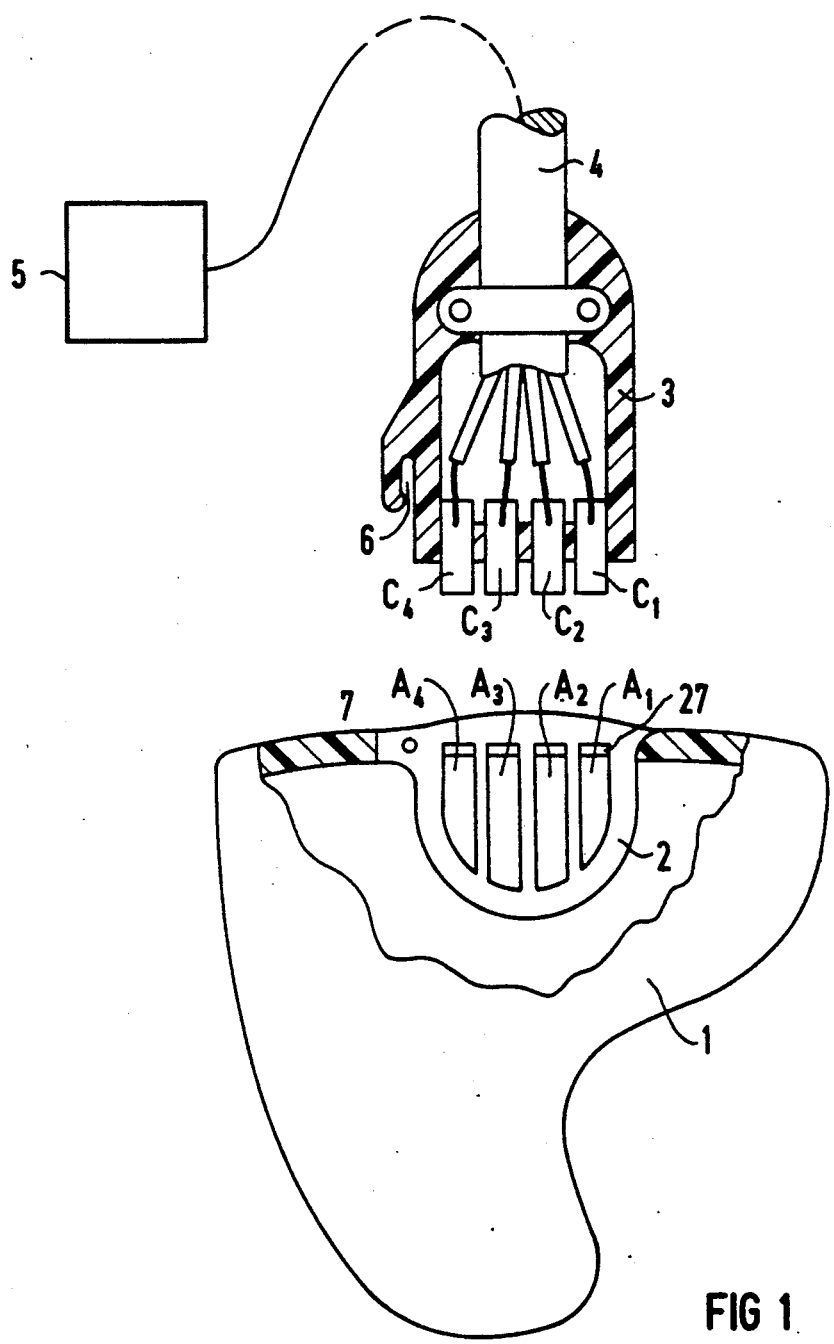
FIG. 1 is a hearing aid of the present invention including individual contacts arranged within the battery compartment in addition to a connector member.

FIG. 1 shows a hearing aid 1 which can be worn in an ear of an individual. A partial section of the ear is shown in FIG. 1 with the direction of view into a battery compartment 2. Contact means are formed with individual contacts $A_1$, $A_2$, $A_3$ and $A_4$ arranged within the battery compartment 2. The individual contacts $A_1$ through $A_4$ can be contacted by corresponding contacts $C_1$, $C_2$, $C_3$ and $C_4$ at a connector member 3 in the form of a plug.

The connector member 3 is connected by a cable 4 to an external programing device 5. The connector member 4 includes a recess that engages a male member 7 when the connector member 3 is introduced into the battery compartment 2. The recess 6 and the male member 7 can interact as a latch and snap-in mechanism and form an exact contact guide for the connector member 3 when it is introduced into the battery compartment 2. An unintentional separation of the electrical plug-type connector during data transmission between the hearing aid 1 and the external programing device 5 is avoided when the recess 6 in the male member 7 are in the form of a snap-in.

Figure 2:
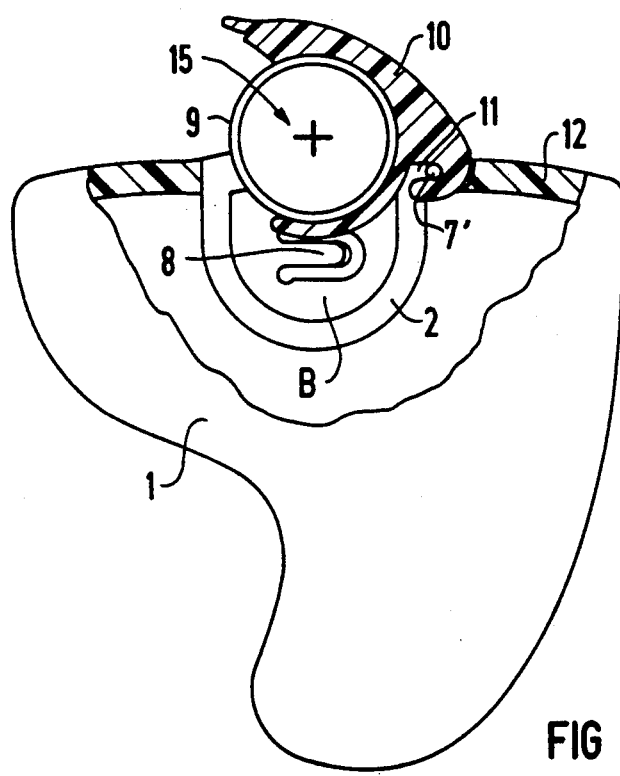
FIG. 2 shows the hearing aid of FIG. 1 whereby the contact means lying opposite thereto is shown.

FIG. 2 illustrates the hearing aid 1 shown in FIG. 1 looking at that side of the battery compartment 2 that lies opposite the contact means $A_1$–$A_4$. A contact means B has a tongue-shaped spring 8 pressing against a pole of an insertable battery 9 arranged at a side of the battery compartment 2. The battery 9 is held in place by a battery holder 10 that is arranged at the hearing aid 1 so as to be capable of pivoting around the male member 7.

The male member 7 as well as a male member 7' (more clearly shown in FIG. 3) and a depression 11 at the battery holder 10 form a releasable hinge. After the battery holder 10 is unhooked from this hinge, the connector member 3, as shown in FIG. 1, can be introduced into the battery compartment 2. Contact D shown in FIG. 3 lying opposite the contacts $C_1$ through $C_4$ at the connector member 10 is then contacted with the contact means B of the hearing aid 1.

Figure 3:
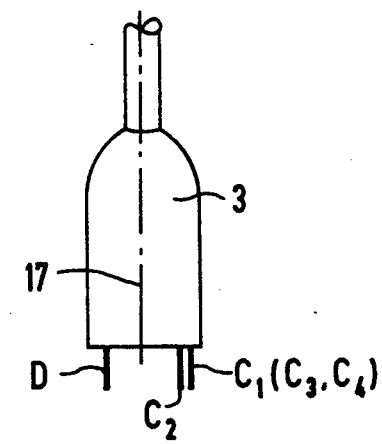
FIG. 3 is a plan view of the battery compartment of the hearing aid of FIG. 1.
Figure 3:
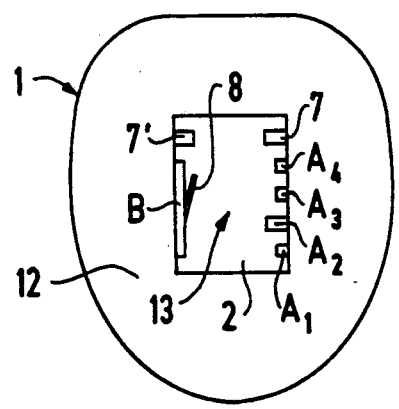
Figure 4:
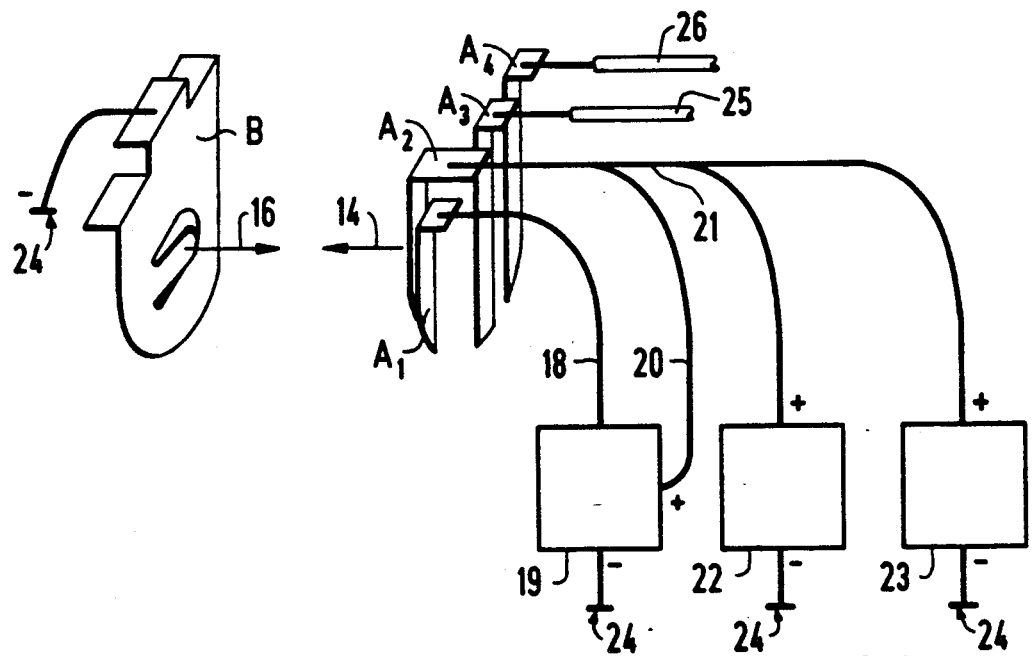
FIG. 4 is a diagram of the contact means of the hearing aid of FIG. 1.

FIG. 3 shows the battery compartment 2 of the hearing aid 1 looking at a face plate 12. One individual contact $A_2$ is arranged saliently in the direction toward a cavity 13 of the battery compartment 2. The other individual contacts $A_1$, $A_3$ and $A_4$ are arranged as shown in FIG. 4. Therefore, only the individual contact $A_2$ may be contacted with a pole of the battery 9, for example, the positive pole 15 as shown in FIG. 2 with the battery 9 inserted.

The tongue-shaped spring 8 at the contact means B is saliently arranged in the cavity 13 of the battery compartment 1 shown in FIG. 3. The tongue-shaped spring 8 and contact means B is also shown in FIG. 4. At the connector member 3 that is shown in a side view in FIG. 3, the contact $C_2$ corresponding to the contact $A_2$ is arranged to be offset in the direction of a centerline 17 with respect to the contact $C_1$ and the contacts $C_3$ and $C_4$ (lying behind the contact $C_1$ and not visible in FIG. 3). Therefore, contacts $C_1$ through $C_4$ at the connector member 3 can be contacted to the contacts $A_1$ through $A_4$ in the battery compartment 2 in a reliable and form fitting manner.

FIG. 4 shows the contact means B as well as contacts $A_1$ through $A_4$ which can be arranged in the battery compartment 2 of the hearing aid 1. The individual contact $A_1$ is connected by a line 18 to a programmable hearing aid part 19. The programmable hearing aid part 19 is connected to the individual contact $A_2$ by a separate line 20. This individual contact $A_2$ supplies the hearing aid 1 with power and can be connected to the positive pole 15 of the battery 9 as shown in FIG. 2.

The positive pole 15 of the battery 9 can also be connected to other hearing aid component parts 22 and 23 by the individual contact $A_2$ and by a line 21. The hearing aid component parts 19, 22 and 23 are each respectively connected to a grounding connection 24 of the contact means B. The contact means B can then be contacted to the other pole of the battery 9, i.e. the negative pole. A two-pole electrical connection between the battery 9 and the hearing aid component parts 19, 22 and 23 is, therefore, produced.

Since the connector member 3 can also be introduced into the battery compartment in contacting fashion instead of the battery 9, a two-pole connection to the power supply can consequently be produced between the external programing device 5 and the hearing aid 1. The other individual contacts $A_3$ and $A_4$ can likewise be connected to the programmable hearing aid part 19 by appropriate input or output (not shown), or it can be connected to other programmable or controllable hearing aid parts by lines 25 and 26.

Figure 5:
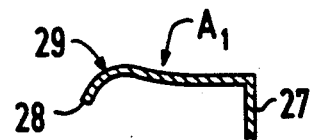
FIG. 5 is a side view of an individual contact as shown in FIG. 4.

FIG. 5 shows a side view of the individual contact $A_1$. An end 27 of the contact $A_1$ is angled to face toward the opening of the battery compartment 2 when it is integrated therein as shown in FIGS. 1 and 4. The angled end 27 can also be used for securing the individual contact 27 to the hearing aid 1. A connecting line 18 shown in FIG. 4 can be connected to the angled end 27. An end 28 lying opposite the angled end 27 has an arc-like elevation 29 much like that of a finger tip that, when the contact $A_1$ is in its inserted condition, the end 28 is directed in a direction of the cavity of the battery compartment 2 as shown by the direction of the arrow 14 in FIG. 4. The other individual contacts $A_2$ through $A_4$ are arranged in exactly the same way as the contact $A_1$ previously described.

When the programmable hearing aid component part 19 in the hearing aid 1 has inputs that do not respond to a DC voltage, it is unnecessary to arrange the programming contacts $A_1$, $A_3$ and $A_4$ in an offset position relative to the power supply contact $A_2$. On the contrary, all individual contacts $A_1$ through $A_4$ can be arranged in a single plane.

It should be understood that various changes and modifications to the presently preferred embodiments described herein will be apparent to those skilled in the art. Such changes and modifications can be made without departing from the spirit and scope of the present invention and without diminishing its attendant advantages. It is, therefore, intended that such changes and modifications be covered by the appended claims.

We claim:

1. A hearing aid comprising:
a plurality of electrical contact means arranged inside a battery compartment for two-pole electrical contact with a battery and to hearing aid component parts, one of said plurality of contact means being positioned in said compartment for making a mechanical and electrical connection with an input, insertable in said compartment, of an external programming device, said plurality of contact means being insulated from one another in the battery compartment in a region of a surface lying opposite a battery pole; and
said one of said plurality of contact means being electrically connected to a programmable hearing aid part.

2. The hearing aid according to claim 1 wherein said plurality of contact means are secured at a region in the battery compartment that lies opposite a contact surface of said pole of said inserted battery.

3. The hearing aid according to claim 1 wherein an individual contact of said plurality of contact means can be contacted to a pole of said battery such that said individual contact is saliently positioned in a cavity of said battery compartment relative to the remaining individual contacts.

4. The hearing aid according to claim 1 wherein said plurality of individual contact means include four individual contacts facing a positive pole of said battery.

5. The hearing aid according to claim 1 wherein said plurality of individual contact means are in the form of a resiliently-shaped tongue.

6. The hearing aid according to claim 1 wherein said plurality of individual contact means are secured therein with ends of said plurality of individual contact means facing toward the opening of said battery compartment, and opposing ends of said plurality of individual contact means facing in an opposite direction from said opening of said battery compartment and further comprise elevations in the direction of said cavity of said battery compartment.

7. The hearing aid according to claim 1 wherein said individual contact connected to said programmable hearing part and the remaining contacts can be connected in common and by multi-poles by a connector member connected to said external programing device and can be introduced into said battery compartment.

8. The hearing aid according to claim 7 wherein said connector member further comprises:
a recess into which a male member of a hinge of said battery compartment can be introduced for an exact contact guide of said connector member.

* * * * *